(12) United States Patent  
Usui (10) Patent No.: US 7,760,237 B2  
(45) Date of Patent: Jul. 20, 2010

(54) IMAGING DEVICE HAVING A BLUR-CORRECTION FUNCTION

(75) Inventor: Kazutoshi Usui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 973 days.

(21) Appl. No.: 11/191,932

(22) Filed: Jul. 29, 2005

(65) Prior Publication Data

US 2006/0028554 A1    Feb. 9, 2006

(30) Foreign Application Priority Data

Aug. 9, 2004 (JP) .............................. 2004-232762

(51) Int. Cl.
*H04N 5/228* (2006.01)
*G02B 27/64* (2006.01)

(52) U.S. Cl. ............................. 348/208.99; 348/208.2; 359/554

(58) Field of Classification Search ............ 348/208.99, 348/208.2, 208.4, 208.6, 208.11, 208.13; 396/52, 55; 359/554
See application file for complete search history.

(56) References Cited

U.S. PATENT DOCUMENTS

| 5,712,474 | A   | * | 1/1998 | Naneda ................... 250/208.1 |
| 6,097,896 | A   |   | 8/2000 | Usui                                |
| 6,778,210 | B1  | * | 8/2004 | Sugahara et al. ......... 348/208.4  |
| 6,888,566 | B2  | * | 5/2005 | Larkin et al. ............. 348/208.4 |
| 7,057,645 | B1  | * | 6/2006 | Hara et al. ............... 348/208.6 |
| 2001/0022619 | A1 | * | 9/2001 | Nishiwaki ................ 348/208   |
| 2005/0025244 | A1 | * | 2/2005 | Lee et al. ............... 375/240.16 |

FOREIGN PATENT DOCUMENTS

| JP | 8-140087    | 5/1996 |
| JP | 09-149313   | 6/1997 |
| JP | 2003-032555 | 1/2003 |
| JP | 3424666     | 5/2003 |

OTHER PUBLICATIONS

Japanese Patent Office Action mailed Jul. 14, 2009 and issued in corresponding Japanese Patent Application No. 2004-232762.

* cited by examiner

*Primary Examiner*—Kelly L Jerabek (57) ABSTRACT

An imaging device according to the present invention includes: an image-capturing optical system forming an image of a subject on a surface of an image sensor; a blur-detecting unit detecting a blur of an optical axis in the image-capturing optical system; an image-capturing unit which divides a total exposure time by a predetermined dividing number to repeat image capturing, and generates a number of images corresponding to the dividing number; and a composing unit which finds a motion vector based on the images in the dividing number generated by the image-capturing unit and on the blur detected by the blur-detecting unit and composes the generated images in the dividing number based on the motion vector. Therefore, it is possible to precisely correct a blur while shortening the time required for the blur correction.

15 Claims, 5 Drawing Sheets

IMAGING DEVICE HAVING A BLUR-CORRECTION FUNCTION

CROSS REFERENCE TO RELATED APPLICATION

This application is based upon and claims the benefit of priority from Japanese Patent Application No. 2004-232762, filed on Aug. 9, 2004, the entire contents of which are incorporated herein by reference.

BACKGROUND OF THE INVENTION

1. Field of the Invention

The present invention relates to an imaging device having a blur-correction function.

2. Description of the Related Art

There have been conventionally known devices such as a blur-correcting device correcting a blur of an optical axis in an image-capturing optical system, an imaging device including such a blur-correcting device. Some of these devices correct a blur by physically moving a part of the image-capturing optical system or an image sensor (or a film). Some others divide the exposure time to repeat image capturing and then compose a number of generated images in accordance with the number of the divisions, thereby correcting a blur (for example, disclosed in Japanese Patent No. 3424666).

However, the aforesaid device which corrects a blur by physically moving part of the image-capturing optical system or the image sensor (or the film), requires an optical system appropriate for the blur correction and a driving unit driving the optical system, which causes a problem of size increase and complication of the device.

Further, the aforesaid device which divides the exposure time to repeat image capturing and then composes generated images in the dividing number, thereby correcting a blur, has a problem that it takes a long time to align positions in composing the images.

SUMMARY OF THE INVENTION

It is an object of the present invention to provide an imaging device capable of precisely correcting a blur while shortening the time required for blur correction.

In order to achieve the object stated above, an imaging device of the present invention includes: an image-capturing optical system forming an image of a subject on a surface of an image sensor; a blur-detecting unit detecting a blur of an optical axis in the image-capturing optical system; an image-capturing unit which divides a total exposure time by a predetermined dividing number to repeat image capturing, and generates a number of images corresponding to the dividing number; and a composing unit which finds a motion vector according to the images in the dividing number generated by the image-capturing unit and to the blur detected by the blur-detecting unit and composes the generated images in the dividing number according to the motion vector.

Further, preferably, the composing unit may compose the number of images corresponding to the dividing number by determining a scan range based on the motion vector and performing block matching of the images in the scan range.

Further, preferably, the composing unit may change a size of the scan range according to a time interval with which the image-capturing unit repeats the image capturing.

Further, preferably, the imaging device may further includes a decision unit which decides whether or not a value indicating the total exposure time is larger than a reciprocal of a value indicating a focal length of the image-capturing optical system. When the decision unit decides that the value indicating the total exposure time is larger than the reciprocal of the value indicating the focal length of the image-capturing optical system, the image-capturing unit may generate images in the dividing number and the composing unit composes the generated images.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, a preferred embodiment of the present invention will be described, using the drawings. This embodiment describes a digital still camera as an example of the imaging device of the present invention.

Figure 1:
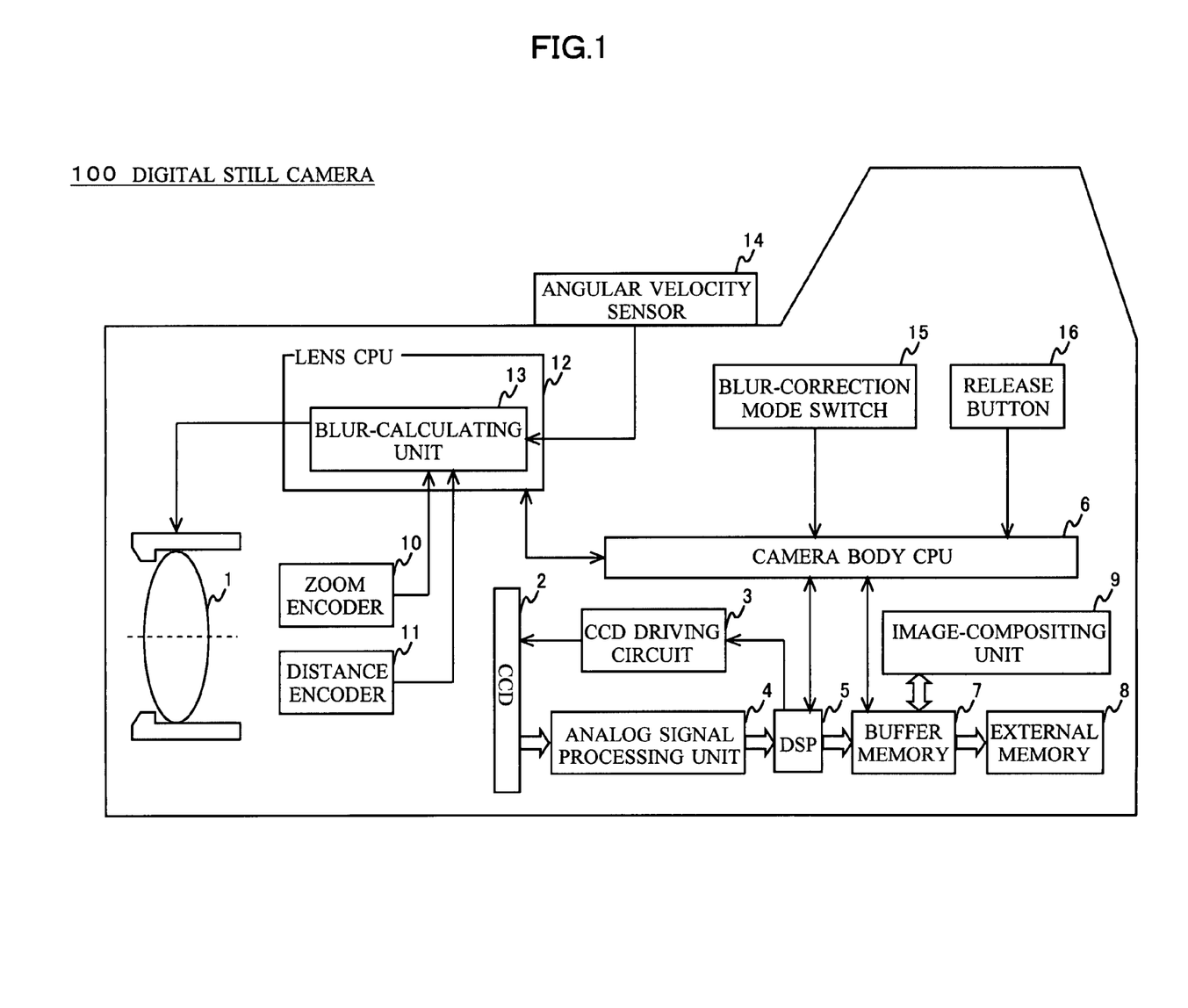
FIG. 1 is a functional block diagram of a digital still camera 100 of this embodiment.

A digital still camera 100 of this embodiment includes, as shown in FIG. 1, an image-capturing lens 1 which is a zoom lens, a CCD (Charge Coupled Device) 2, a CCD driving circuit 3 driving the CCD 2, an analog signal processing unit 4, a DSP (Digital Signal Processor) 5, a camera body CPU 6, a buffer memory 7, an external memory 8, and an image-composing unit 9.

The image-capturing lens 1 forms an image of a subject on an image-capturing surface of the CCD 2, and the CCD 2 converts the subject image to an image signal to supply the image signal to the analog signal processing unit 4. The analog signal processing unit 4 samples the image signal photoelectrically converted by the CCD 2, A/D-converts the sampled signal after amplifying it to a predetermined level, and supplies the resultant signal to the DSP 5. The DSP 5 controls the CCD driving circuit 3 and adjusts an electronic shutter time, and it also applies digital image processing to the signal supplied from the analog signal processing unit 4 and supplies the resultant image to the buffer memory 7. The buffer memory 7 temporarily stores the image that has been subjected to the image processing in the DSP 5 and supplies it to the external memory 8 and the image-composing unit 9, when necessary. The external memory 8 is an external memory such as a memory card, and the image-composing unit 9 detects a later-described motion vector and composes images. Further, the camera body CPU 6 is mutually connected to the aforesaid DSP 5 and buffer memory 7 to control the DSP and the buffer memory 7.

The digital still camera 100 further includes: a zoom encoder 10 detecting a zoom position of the image-capturing lens 1; a distance encoder 11 detecting information on an image-capturing distance; a lens CPU 12; a blur-calculating unit 13 provided in the lens CPU 12; and an angular velocity sensor 14.

The angular velocity sensor 14, which is a typical piezo-vibration sensor, detects an angular velocity of a blur by monitoring a Coriolis force. Further, the angular velocity sensor 14 amplifies the detected angular velocity to an extent such that it falls within an A/D dynamic range and supplies the angular velocity to the lens CPU 12 after A/D-converting it. Note that the angular velocity sensor 14 has a LPF (Low Pass Filter) for filtering out a high-frequency noise. The blur-calculating unit 13 obtains outputs of the aforesaid zoom encoder 10, distance encoder 11, and angular velocity sensor 14 to calculate an amount of the blur.

Note that the lens CPU 12 controls the image-capturing lens 1 and is mutually connected to the aforesaid camera body CPU 6.

The digital still camera 100 further includes: a blur-correction mode switch 15 for receiving a user operation to execute the blur correction, which is a feature of the present invention; and a release button 16 for receiving a user operation to start image capturing. Statuses of the blur-correction mode switch 15 and the release button 16 are detected by the camera body CPU 16.

Figure 2:
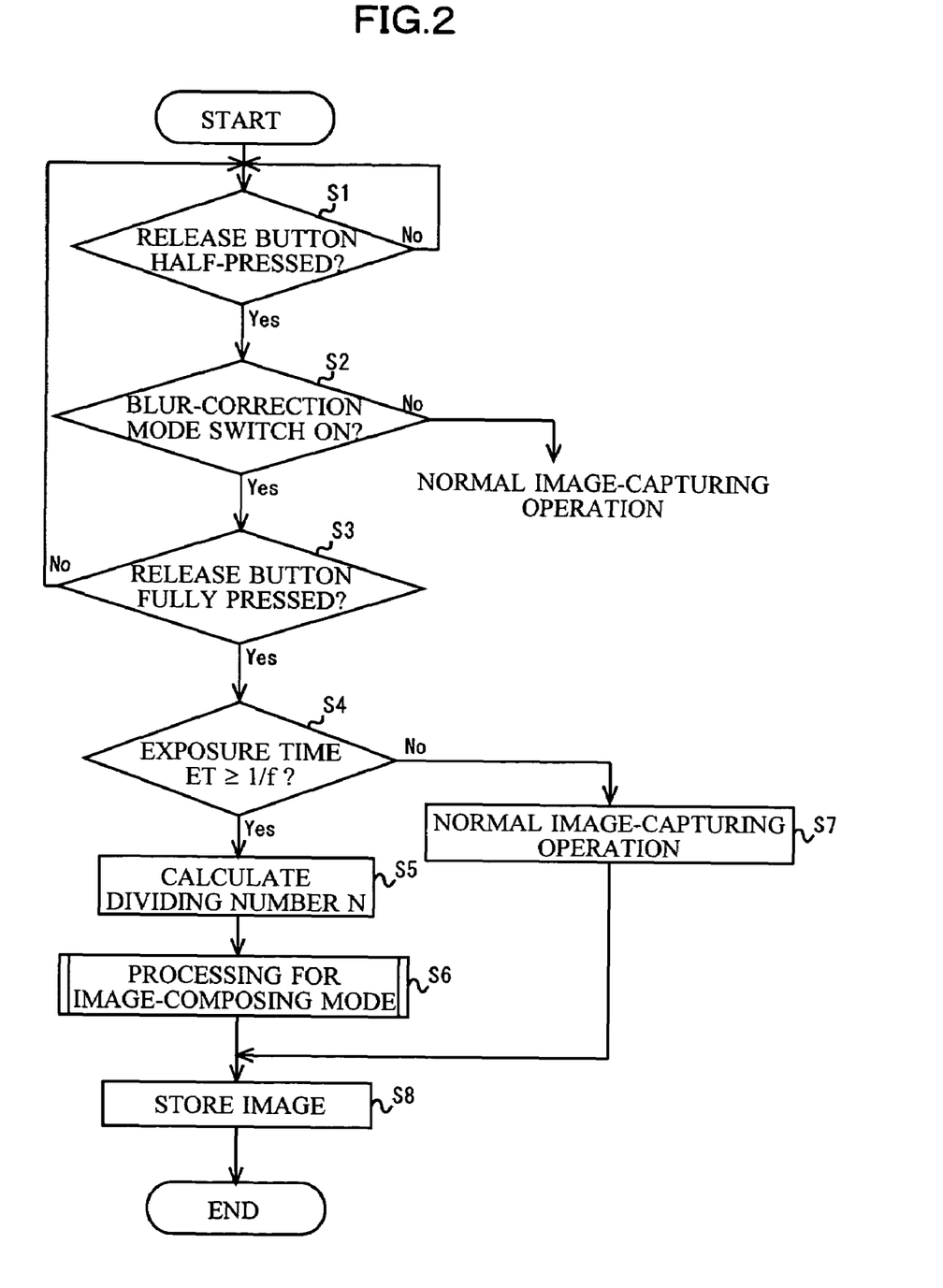
FIG. 2 is a flowchart showing an operation of the digital still camera 100 of this embodiment.

Hereinafter, an image-capturing operation will be described, using the flowchart in FIG. 2.

Note that a blur and a correction thereof only in a pitching direction will be described below for simplicity. Operations for a yawing direction are the same. Further, in this embodiment, the exposure time is divided as will be described later. A dividing number at this time is calculated based on the exposure time and a focal length.

First, the camera body CPU 6 judges whether or not the release button 16 is half-pressed (Step S1).

When the release button 16 is half-pressed, the camera body CPU 6 starts image-capturing operation to judge whether or not the blur-correction mode switch 15 is ON (Step S2).

When the blur-correction mode switch 15 is not ON, the camera body CPU 6 performs a normal image-capturing operation. On the other hand, when the blur-correction mode switch 15 is ON, the camera body CPU 6 starts blur detection by the angular velocity sensor 14 via the lens CPU 12, and subsequently judges whether or not the release button 16 is fully pressed (Step S3).

When the release button 16 is not fully pressed, the camera body CPU 6 returns to Step S1. On the other hand, when the release button 16 is fully pressed, the camera body CPU 6 judges whether or not an exposure time ET is equal to or longer than a reciprocal (1/f) of a focal length f (Step S4).

It is generally known that in normal image capturing, a blur occurs in an image when the exposure time exceeds the reciprocal (1/f) of the focal length f. Therefore, when the exposure time is longer than the reciprocal (1/f) of the focal length f, the blur correction can be judged as necessary, and when the exposure time is shorter than the reciprocal (1/f) of the focal length f, the blur correction can be judged as unnecessary.

When the exposure time ET is longer than the reciprocal (1/f) of the focal length f (Yes at Step S4), the camera body CPU 6 calculates a dividing number N (Step S5). The dividing number N is a number by which the aforesaid exposure time is divided and it can be calculated by using the following expression.

$$N = ET/(1/f) \quad \text{(Expression 1)}$$

Note that ET represents the exposure time (unit: second), and f represents the focal length (unit: mm) in 35 mm film equivalent terms.

In a case of $\{N-\text{int}(N)\} \neq 0$ in which int( ) being a function for finding an integer portion is used, that is, when the dividing number N is not an integer, the following expression is used instead of the above (Expression 1) to calculate the dividing number N.

$$N = \text{int}\{ET/(1/f)\} + 1 \quad \text{(Expression 1')}$$

By using (Expression 1') to calculate the dividing number N, the dividing number N not being an integer is rounded up.

The camera body CPU 6 finds the exposure time ET according to a program diagram stored in advance in a not-shown memory in the camera body CPU 6 and finds the focal length f based on the output of the zoom encoder 10. Then, the camera body CPU 6 calculates the dividing number N by using (Expression 1) or (Expression 1').

Then, the camera body CPU 6 performs later-described processing for a composing mode (Step S6). On the other hand, when the exposure ET is shorter than the reciprocal (1/f) of the focal length f (No at Step S4), the camera body CPU 6 performs normal image capturing (Step S7). The normal image capturing is performed in the same manner as that of a known art.

Next, the camera body CPU 6 stores in the external memory 8 (Step S8) an image generated by the processing for the composing mode (Step S6) or an image generated by the normal image capturing (Step S7) to finish a series of the processing. Note that, when the image to be stored in the external memory 8 is generated by the processing for the composing mode (Step S6), the camera body CPU 6 records in tag information of the image (for example, EXIF information or the like) that the image composition has been performed.

Figure 3:
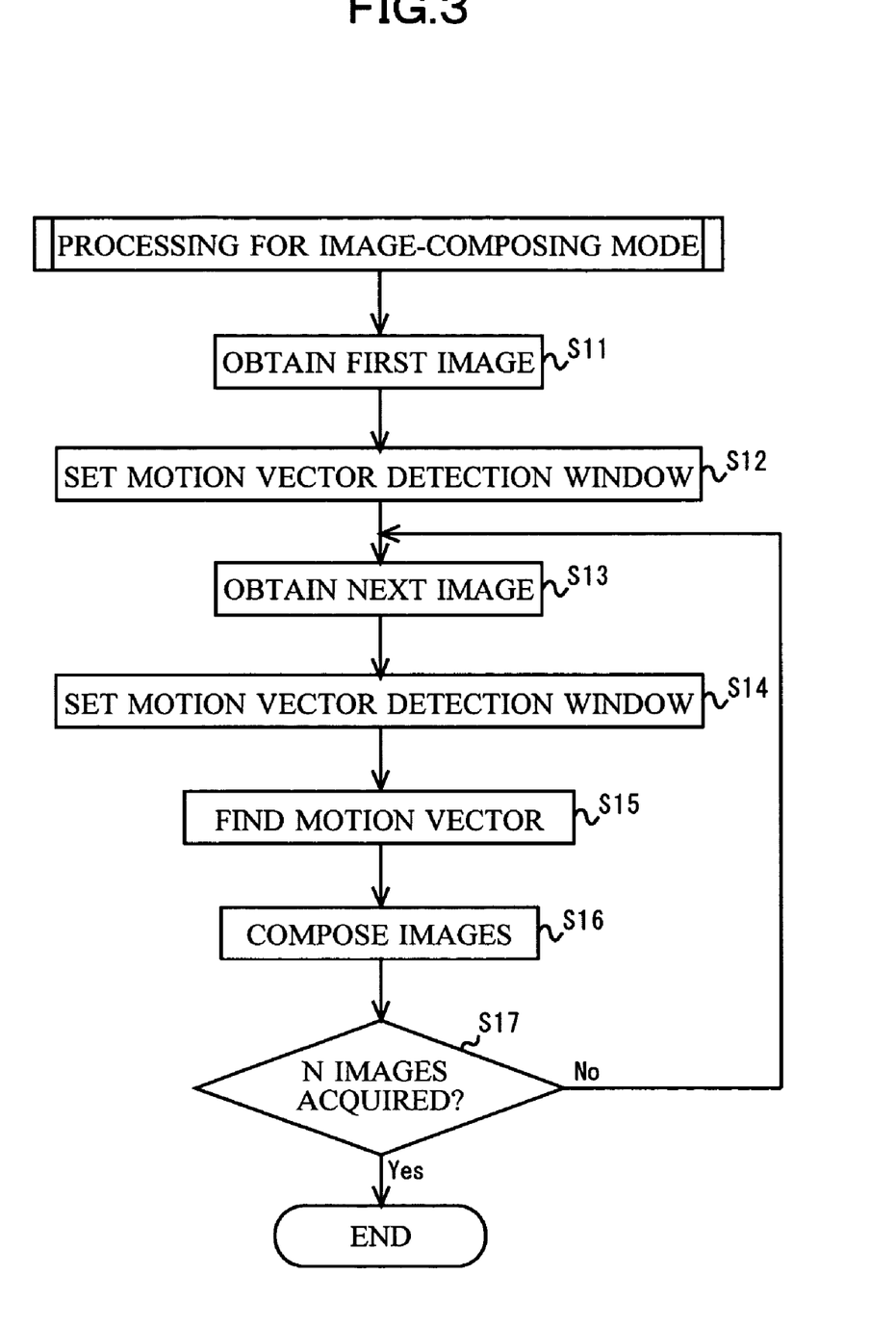
FIG. 3 is a flowchart showing an operation of the digital still camera 100 of this embodiment.

Next, the processing for the composing mode which is a feature of the present invention will be described, using the flowchart in FIG. 3. Note that a case where the exposure time ET=$\frac{1}{50}$ second and the focal length f=200 mm (in 35 mm film equivalent terms) will be described here as an example. Note that the dividing number N is calculated as 4 by the aforesaid (Expression 1).

First, the camera body CPU 6 obtains a first image (Step S11). The camera body CPU 6 controls the CCD 2 via the CCD driving circuit 3 to obtain the first image with the exposure time of $\frac{1}{200}$ (1/focal length) and records the obtained image in the buffer memory 7 via the analog signal processing unit 4 and the DSP 5. Incidentally, since the proper exposure time is $\frac{1}{50}$ second, an exposure amount is only $\frac{1}{4}$ of proper exposure amount. Therefore, the obtained image is an under-exposed image.

Figure 4:
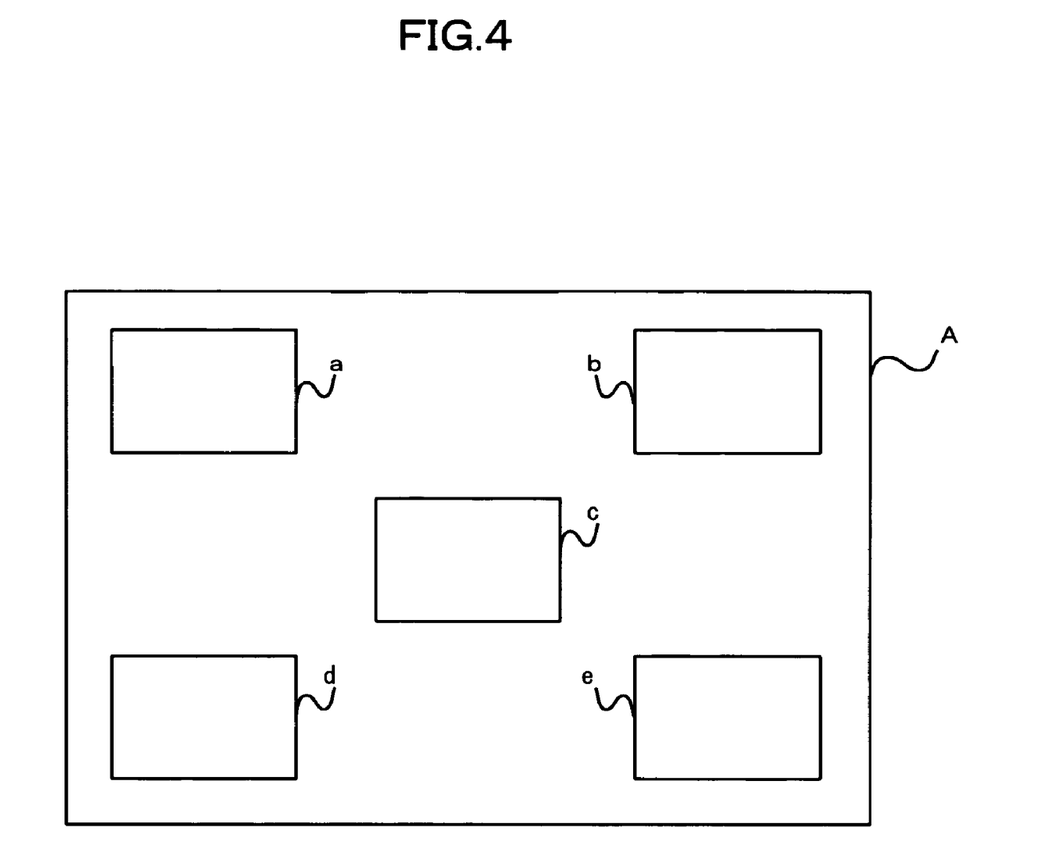
FIG. 4 is a view showing candidate areas for a motion vector detection window.

Next, the camera body CPU 6 sets a motion vector detection window for the image obtained at Step S11 (Step S12). The motion vector detection window is an area used for later-described detection of a motion vector. The camera body CPU 6 detects a contrast of each predetermined candidate area for the motion vector detection window. FIG. 4 shows the candidate areas for the motion vector detection window. A in FIG. 4 denotes the whole image obtained at Step S11, and a to e represent the candidate areas for the motion vector detection window. The candidate areas a to e for the motion vector detection window are set at five places, that is, upper left, upper right, center, lower left, and lower right in the image A, as shown in FIG. 4.

The camera body CPU 6 detects the contrast in each of the candidate areas for the motion detection window, and a candidate area whose detected contrast is equal to or more than a predetermined value is judged as highly reliable and is set as the motion vector detection window area. On the other hand, a candidate area whose detected contrast is less than the predetermined value is judged as low in reliability and is not set as the motion vector detection window area (that is, this candidate area is not used for the detection of the motion vector). In the following description, it is assumed that only the center candidate area c for the motion vector detection window out of the candidate areas a to e for the motion vector detection window is set as the motion vector detection window.

Next, the camera body CPU 6 obtains a next image in a similar manner as that at Step S11 (Step S13). Then, it records the obtained image in the buffer memory 7 via the analog signal processing unit 4 and the DSP 5.

Next, the camera body CPU 6 sets a motion vector detection window for the image obtained at Step S13 (Step S14). The camera body CPU 6 adds information obtained from the angular velocity sensor 14 to information on the motion vector detection window set at Step S12, and sets the motion vector detection window for the image obtained at Step S13. Specifically, the following expression is used.

$$X2=X1+\{X\text{omega}(t2)-X\text{omega}(t1)\} \quad \text{(Expression 2)}$$

Note that X1 represents a center X coordinate of the motion vector detection window set at Step S12, and X2 represents a center X coordinate of the motion vector detection window that is going to be set. Further, Xomega (t2) and Xomega (t1) represent blur amounts obtained from the output of the angular velocity sensor 14 at times t2, t1 respectively.

Figure 5:
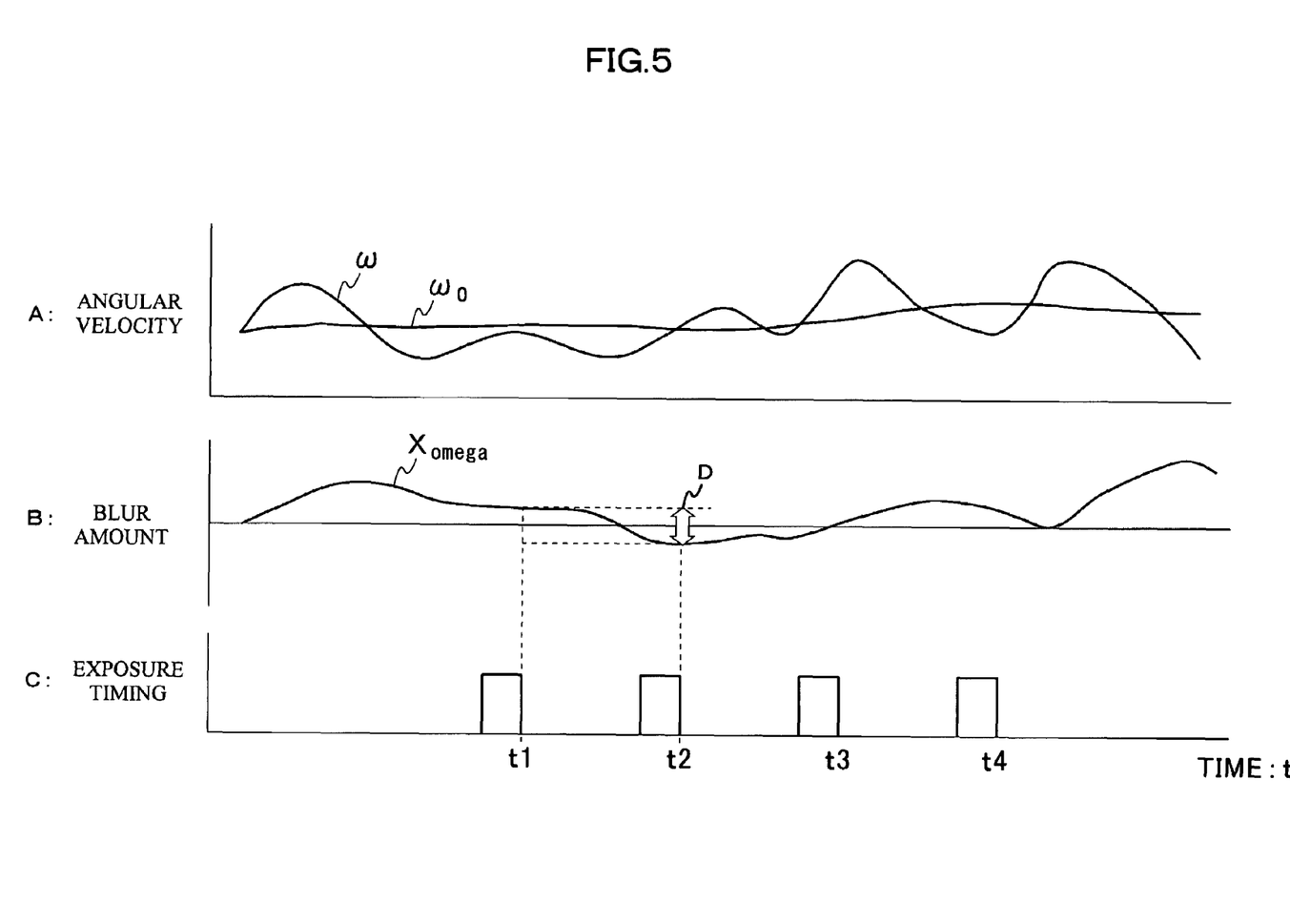
FIG. 5 is a view to explain an output of an angular velocity sensor 14.

Here, the output of the angular velocity sensor 14 will be described, using FIG. 5. The horizontal axis in FIG. 5 shows the time t. The angular velocity sensor 14 detects an angular velocity shown in A in FIG. 5. In FIG. 5A, ω represents the angular velocity detected by the angular velocity sensor 14, and $\omega_0$ represents a low-frequency component of the angular velocity ω. The blur-calculating unit 13 integrates the angular velocity ω, using $\omega_0$ as a reference, in order to convert the output of the angular velocity sensor 14 to the blur amount. Then the result of the integration is the blur amount Xomega shown in B in FIG. 5. Note that Xomega (t) represents the blur amount at the time t.

Further, the exposure timing is shown in C in FIG. 5. In this embodiment, in image capturing, the exposure time is quartered as previously described. The digital still camera 100 repeats image capturing at the four exposure timings as shown in C in FIG. 5. Further, {Xomega (t2)−Xomega (t1)} in (Expression 2) represents a difference between the blur amount at the time t2 and the blur amount at the time t1, and corresponds to the arrow D in B in FIG. 5.

The camera body CPU 6 performs the same processing also for a Y direction to find a center Y coordinate. Then, the motion vector detection window with a predetermined size is set, the center thereof being the center X coordinate and the center Y coordinate.

Next, the camera body CPU 6 finds the motion vector (Step S15). The camera body CPU 6 extracts an image of a portion corresponding to the motion vector detection window set at Step S12, from the image obtained at Step S13. Then, block matching is performed for the image $f_{n-1}$ obtained at Step S11 and the image $f_n$ obtained at Step S13. Specifically, the image which is extracted from the image $f_n$ obtained at Step S13 is scanned in an X direction and a Y direction in a unit of prescribed pixels, the center of the scanning being the portion corresponding to the motion vector detection window set at Step S12 in the image $f_{n-1}$ obtained at Step S11, and a position where the correlation is the largest is found. The camera body CPU 6 uses the following expression to find the position where the correlation is the largest.

$$D = \sum_i \sum_j |f_n(X_i, Y_j) - f_{n-1}(X_i + dx, y_j + dy)| \quad \text{(Expression 3)}$$

In (Expression 3), $fn(x_i, y_j)$ represents a value of $(x_i, y_j)$ in an n field. Then, dx and dy are varied, and a position where D in (Expression 3) becomes the smallest is defined as the position with the largest correlation, and based on dx and dy, the motion vector based on the images is found. Then, the motion vector based on the images and the vector based on the output of the angular velocity sensor 14 are added, thereby finding a motion vector to be used for the composition.

Incidentally, the scan range is basically decided by multiplying the size of the motion vector detection window by a predetermined multiplier, but in this embodiment, since the motion vector detection window is set based on the output of the angular velocity sensor 14, the scan range can be set smaller than a conventional range. Further, the size of the scan range is changed according to an exposure time interval. With a long exposure time interval, the scan range is made larger, while with a short exposure time interval, the scan range is made smaller.

Next, the camera body CPU 6 composes the images in the image-composing unit 9 based on the motion vector found at Step S15 (Step S16). The camera body CPU 6 reads the images from the buffer memory 7, and laps the images one on the other based on the motion vector to compose them. However, as for a portion where the second image does not overlap with the first image, image data is doubled since this portion has lower brightness. Then, the image after the composition is stored in the buffer memory 7.

Next, the camera body CPU 6 judges whether or not the acquisition of images of the dividing number N (4 here) is finished (Step S17). Incidentally, the number of times the image is acquired can be counted by a counter provided in the camera body CPU 6. When the number of images corresponding to the dividing number N is acquired (Yes at Step S17), the camera body CPU 6 goes to Step S8 in FIG. 2 to finish a series of the processing.

On the other hand, when the acquisition of the images corresponding to the dividing number N is not finished (No at Step S17), the camera body CPU 6 returns to Step S13 to obtain a next image. Note that, in setting a motion vector detection window here, the following expression is used instead of (Expression 2) which is used for setting the motion vector detection window at Step S14.

$$X_m = X_{m-1} + \{X\text{omega}(t_m) - X\text{omega}(t_{m-1})\} \quad \text{(Expression 4)}$$

Note that m in (Expression 4) represents an $m^{th}$ image. Therefore, as for the third image, m=3.

Further, when the images are composed at Step S16, the image obtained from the last composition is read from the buffer memory 7, and this image and a next image are composed.

As has been described above, according to this embodiment, a blur of the optical axis in the image-capturing optical system is detected, while the total exposure time is divided by the predetermined dividing number to repeat image capturing and generate the number of images corresponding to the dividing number. Then, the motion vector is found based on the number of images and the detected blur, and the number of images are composed according to the motion vector. Therefore, it is possible to accurately find the motion vector in a short time, which enables accurate blur correction while shortening the time required for the blur correction.

Further, according to this embodiment, the scan range is decided based on the motion vector, and the block matching is performed in the decided scan range to compose images. Therefore, it is possible to avoid widening the scan range more than necessary to shorten the time required for the blur correction.

Moreover, according to this embodiment, the size of the scan range is changed according to the time interval with which the image-capturing unit repeats the image capturing. In other words, the scan range is changed in consideration of an error that is likely to occur according to the time interval, so that erroneous detection can be lessened, which enables accurate blur correction.

Further, according to this embodiment, when it is judged that the value indicating the total exposure time is larger than the reciprocal of the value indicating the focal length of the image-capturing optical system, the number of images corresponding to the dividing number are generated for composition. Therefore, it is possible to perform the blur correction only when the generation and composition of the dividing number of images are necessary and avoid performing unnecessary blur correction.

Note that this embodiment shows the example where, in setting the motion vector detection window (Step S12 in FIG. 3), the motion vector detection window used for the detection of the motion vector is selected based on the contrast, from the predetermined candidate areas a to e for the motion vector detection window (see FIG. 4), but the size, position, number, and the like of the detection windows may be variable according to a user operation. Another possible configuration is such that a characteristic point of an image is extracted and an area including the characteristic point is set as the motion vector detection window. Further, an area used for the detection of a focal point may be set as the motion vector detection window.

Further, in this embodiment, in setting the motion vector detection window (Step S12 in FIG. 3), if all the candidate areas have uniformly low reliability, the motion vector may be found according only to the output of the angular velocity sensor 14, the image being judged as a low-contrast image. Further, when block matching is performed for cyclic images including stripes or the like, there is some case where several positions are obtained as positions with high correlation, resulting in erroneous finding of the motion vector. Therefore, when a predetermined level of correlation cannot be obtained, the motion vector may be found according only to the output of the angular velocity sensor 14.

Further, this embodiment shows the example where the processing is repeated up to the predetermined dividing number of times, but the processing may be discontinued when a predetermined ratio or higher of the images to be composed exceeds a dynamic range.

Further, this embodiment shows the example where the positions of the motion vector detection windows in and after the second image are determined based on the output of the angular velocity sensor 14, but an alternative configuration may be such that the motion vector detection windows in the first image and the second image are set at the same position, and in finding the motion vector at Step S15, the scan direction or the scan range is restricted based on the output of the angular velocity sensor 14.

Further, this embodiment shows the example where the angular velocity sensor 14 is provided to detect a blur, but other sensor (for example, an acceleration sensor or the like) may be provided for the blur detection.

Further, this embodiment shows the example where (Expression 1) or (Expression 1') is used for calculating the dividing number N, but other expression may be used for calculation, or the dividing number N may be designated by a user.

Further, this embodiment shows the example where, in the blur detection based on the output of the angular velocity sensor 14, a blur at the end timing of capturing each of the number of images corresponding to the dividing number (see FIG. 5) is used as a basis of the blur detection, but a blur at other timing (for example, each start timing of image capturing) may be used as a basis of the blur detection.

Further, this embodiment shows the example where, in the image composition (Step S16 in FIG. 3), the image data on the portion where the second image does not overlap with the first image is doubled since this portion have low brightness, but the portion with no overlapping may be discarded.

Further, in this embodiment, the digital still camera 100 is described as an example of the imaging device, but the present invention may be applied to a digital still camera of a lens interchangeable type, or may be applied to an imaging device such as a video camera. In addition, a vibration sensor included in an imaging device having a function of correcting a blur of an optical axis in a so-called image-capturing optical system may be used for the processing of the present invention.

Further, the steps of the processing for image composition performed by the digital still camera 100 (see the flowchart in FIG. 3) may be entirely or partly realized by a computer. In this case, an imaging device such as the digital still camera 100 detects a blur of an optical axis in an image-capturing optical system and divides the total exposure time by a predetermined dividing number for repeated image capturing, and the computer obtains a number of generated images corresponding to the dividing number and information indicating the detected blur.

The invention is not limited to the above embodiments and various modifications may be made without departing from the spirit and scope of the invention. Any improvement may be made in part or all of the components.

What is claimed is:

1. An imaging device comprising:
a blur-detecting unit which detects a blur of a device;
a decision unit which decides whether a value indicating an exposure time is larger than a reciprocal of a value indicating a focal length of an image-capturing optical system forming an image of a subject of a surface of an image sensor;
an image-capturing unit which obtains a number of images by dividing said exposure time by a predetermined dividing number and repeats image capturing to generate a plurality of images according to the number of images, when said decision unit decides that the value indicating said total exposure time is larger than the reciprocal of the value indicating the focal length of said image-capturing optical system; and
a composing unit which finds a motion vector according to the plurality of images generated by said image-capturing unit and to said blur detected by said blur-detecting unit, and composes the generated plurality of images according to said motion vector.

2. The imaging device according to claim 1, further comprising:
a setting unit which sets a divided exposure time of each of the plurality of images so that an exposure of an image obtained by composing the plurality of images corresponds to a properly exposed image.

3. The imaging device according to claim 1, wherein
said composing unit sets a scan range on said plurality of generated images based on said blur detected by said blur-detecting unit, and finds said motion vector by performing block matching of said plurality of images within said scan range.

4. The imaging device according to claim 3, wherein
said composing unit changes a size of said scan range according to a time interval with which said image-capturing unit repeats the image capturing.

5. The imaging device according to claim 1, wherein
said blur-detecting unit detects a blur of an optical axis in said image-capturing optical system.

6. An imaging device, comprising:
a blur-detecting unit which detects a blur of a device;
an image-capturing unit which obtains a divided exposure time by dividing an exposure time by a predetermined dividing number, and repeats image capturing using the divided exposure time, to generate a plurality of underexposed images; and
a composing unit which finds a motion vector based on said plurality of underexposed images generated by said image-capturing unit and on said blur detected by said blur-detecting unit, and obtains a proper image having a proper exposure by composing said plurality of underexposed images according to said motion vector, wherein
said image-capturing unit divides said exposure time by said predetermined dividing number when a value indicating said exposure time is larger than a reciprocal of a value indicating a focal length of an image-capturing optical system forming an image of a subject on a surface of an image sensor.

7. The imaging device according to claim 6, wherein
said image-capturing unit decides said predetermined number based on said value indicating the focal length and on said exposure time.

8. An imaging device, comprising;
a blur-detecting unit which detects a blur of a device;
an image-capturing unit which divides an exposure time by a predetermined dividing number to obtain a divided exposure time used to repeat image capturing and generate a plurality of images; and
a composing unit which sets at least one detection area on said plurality of images based on said blur detected by said blur-detecting unit, finds a motion vector by performing image matching within said detection area, and composes said plurality of images according to said motion vector, wherein
said composing unit decides a dimension of said detection area based on a time interval with which said image-capturing unit repeats the image capturing.

9. The imaging device according to claim 8, wherein
said composing unit makes said dimension of said detection area larger as said time interval becomes longer.

10. An imaging method, comprising:
detecting a blur of a device;
deciding whether a value indicating an exposure time is larger than a reciprocal of a value indicating a focal length of an image-capturing optical system forming an image of a subject on a surface of an image sensor;
dividing said exposure time by a predetermined dividing number to determine a number of images, and repeating image capturing the number of images times, to generate a plurality of images, when the deciding determined that said exposure time is larger than the reciprocal of the value indicating the focal length of said image-capturing optical system; and
finding a motion vector based on the plurality of images and on said blur, and composing said plurality of images according to said motion vector.

11. The imaging method according to claim 10, further comprising:
setting a scan range on said plurality of generated images based on said blur, wherein the finding of said motion vector is achieved by performing block matching of said plurality of images within said scan range.

12. An imaging method, comprising;
detecting a blur of a device;
obtaining a divided exposure time by dividing an exposure time by a predetermined dividing number, and repeating image capturing using the divided exposure time, to generate a plurality of underexposed images;
finding a motion vector based on said plurality of underexposed images and on said detected blur, and
obtaining a proper image having a proper exposure by composing said plurality of underexposed images according to said motion vector,
wherein said divided exposure time is obtained, when a value indicating said exposure time is larger than a reciprocal of a value indicating a focal length of an image-capturing optical system forming an image of a subject on a surface of an image sensor.

13. An imaging method comprising:
detecting a blur of a device;
dividing an exposure time by a predetermined dividing number to obtain a divided exposure time used to repeat image capturing using the divided exposure time, to generate a plurality of images;
selling at least one detection area on said plurality of images based on said blur, and finding a motion vector by performing image matching within said detection area;
composing said plurality of images according to said motion vector; and
deciding a dimension of said detection area based on a time interval at which said image capturing is repeated.

14. An imaging device, comprising:
an angular velocity sensor to detect a blur of a device and to output an angular velocity corresponding to said blur;
an image-capturing unit to divide an exposure time by a predetermined dividing number to obtain a divided exposure time, and to generate a plurality of images by repeating an image capturing using the divided exposure time; and
a composing unit to set at least one detection area on said plurality of images based on said angular velocity corresponding to said blur output from said angular velocity sensor, to find a motion vector by performing image matching within said at least one detection area, and to compose said plurality of images according to said motion vector, wherein
said composing unit determines a dimension of said at least one detection area based on a time interval at which the image capturing is repeated.

15. An imaging method, comprising:
detecting an angular velocity corresponding to a blur of an imaging device, by an angular velocity sensor;
dividing an exposure time by a predetermined dividing number to obtain a divided exposure time;

repeatedly performing an image capturing using the divided exposure time, to generate a plurality of images;

selling at least one detection area on said plurality of images based on said angular velocity;

performing an image matching within said detection area to determine a motion composing said plurality of images according to said motion vector;

composing said plurality of images according to said motion vector; and determining a dimension of said detection area based on a time interval at which said image capturing is repeated.

* * * * *

UNITED STATES PATENT AND TRADEMARK OFFICE
CERTIFICATE OF CORRECTION

PATENT NO.         : 7,760,237 B2                                                                    Page 1 of 1
APPLICATION NO. : 11/191932
DATED              : July 20, 2010
INVENTOR(S)        : Kazutoshi Usui It is certified that error appears in the above-identified patent and that said Letters Patent is hereby corrected as shown below:

Column 10, Line 36 delete "selling" and insert -- setting --, therefor.

Column 11, Line 3 delete "selling" and insert -- setting --, therefor.

Column 12, Line 1-2 before "and" delete "composing said plurality of images according to said motion vector;".

Signed and Sealed this

Twenty-first Day of December, 2010

David J. Kappos
*Director of the United States Patent and Trademark Office*